March 9, 1948.　　M. E. AMES, JR., ET AL　　2,437,449
REFLEX THERMAL ELECTRIC METER
Filed Aug. 3, 1944　　2 Sheets-Sheet 1

INVENTORS.
Millard E. Ames Jr.
and
BY David E. Sunstein
ATTORNEY

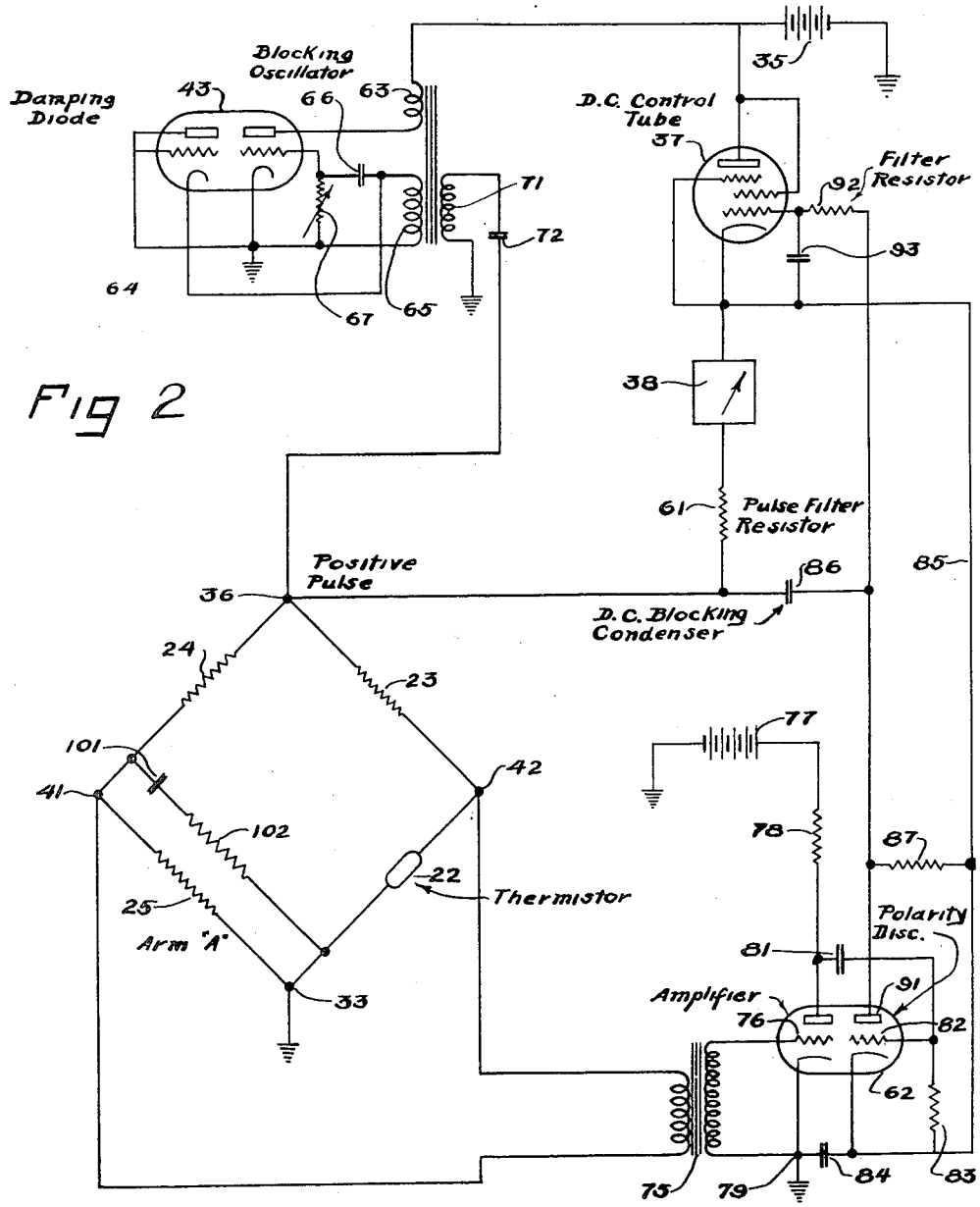

Patented Mar. 9, 1948

2,437,449

UNITED STATES PATENT OFFICE 2,437,449

REFLEX THERMAL ELECTRIC METER

Millard E. Ames, Jr., Philadelphia, and David E. Sunstein, Elkins Park, Pa., assignors to Philco Corporation, Philadelphia, Pa., a corporation of Pennsylvania Application August 3, 1944, Serial No. 547,936

8 Claims. (Cl. 171—95)

Our invention relates in general to the field of electrical measurements and more particularly concerns a novel ultra-high frequency power indicating device. In ultra-high frequency work, it is often necessary to measure the power delivered to a termination of a wave guide or other transmission line.

Heretofore many problems have arisen in the direct measurement of ultra-high frequency power. Amongst the difficulties encountered in previous power measuring equipment was the inability to properly standardize equipment using known producible standards. Thus, after each power reading it was essential to calculate the true dissipation measured.

We have discovered that we can secure accurate power readings by a null method of measuring the fluctuations in resistance of a power absorption element. However, the variations in resistance with temperature and accordingly with the actual amount of power of the element utilized for power absorption at the wave guide termination results in producing a variable impedance termination of the transmission line. This makes it necessary to adjust matching stubs to neutralize the line mismatch whenever the power level changes.

Our invention contemplates a bridge type power indicating device which overcomes the disadvantages heretofore encountered in the measurement of ultra-high frequency power. The basic elements of the power indicating device of our invention is an automatic self-balancing Wheatstone bridge network; one arm of which comprises a standard commercial thermistor. As is well understood, a thermistor is a sensitive resistance device having a resistance characteristic which is a decreasing function of its operating temperature.

In carrying out our invention, we employ any nonlinear resistor which changes its resistance with temperature such as glass or the thermistor already mentioned.

As utilized in our novel power indicating circuit, this thermistor is maintained at a constant temperature which corresponds essentially to constant resistance and constant power dissipation. The thermistor resistance element is utilized as the power absorption element of the power indicating system, and accordingly, since constant resistance is maintained at all times, impedance matching will present no problem if the thermistor is used as a transmission line termination.

In the wattmeter circuit, the thermistor is energized from three distinct power sources. The first power source is a direct current source applied to the bridge network containing the thermistor. The second power source is a unidirectional pulse generator which functions to control the operation of the power indicating circuit and with the D. C. power serves to maintain the normally desired temperature of the thermistor.

The third source of power which may be applied to the thermistor is the source of ultra-high frequency energy which is to be measured. For this purpose, the thermistor is supported within a simple mount arranged to suitably terminate the transmission line carrying the ultra-high frequency signal. If this high frequency energy is transmitted through a wave guide, then a hollow wave guide mount is used for the thermistor and properly terminates the transmission system so that maximum energy is delivered to the thermistor.

For other transmission systems, such as coaxial or parallel wire transmission lines, corresponding thermistor mounts are provided. The thermistor mount is arranged so that the ultra-high frequency energy and the aforementioned D. C. and pulsing power may be simultaneously applied without mutual interference.

As previously mentioned, the direct current and the pulsing sources of power are normally used to maintain the desired constant operating temperature of the thermistor. The application of ultra-high frequency energy to the thermistor operates to cause bridge unbalance by increasing the thermistor dissipation.

This effect is automatically counterbalanced through the agency of the pulsing source of power which acts upon the bridge balance to reduce the direct current flow to that point where the energy as supplied from all three sources is substantially that value required to maintain the normal required resistance and dissipation in the thermistor.

The circuit functions upon a tendency toward any change in thermistor dissipation and is entirely automatic and extremely rapid in action. Since the ultra-high frequency energy applied to the thermistor is counteracted by a corresponding automatic reduction in the direct current energy applied, the high frequency power is directly equal to the reduction in the direct current power supplied. Since the power supplied by a direct current source is readily measured by simple indicating type instruments, the novel thermistor bridge provides a direct reading high frequency wattmeter or bolometer.

Summarizing, therefore, our novel thermistor bridge provides means for directly indicating ultra-high frequency power while the calibration of the instrument is simply and effectively accomplished in terms of direct current power.

The transmission line termination and power absorbing elements are of constant impedance and thus eliminate the need for complex matching arrangement to ensure the desired energy transfer. As will be described in greater detail later, the pulsing energy applied to the power indicating system functions as the control voltage for automatically determining the necessary D. C. power required to maintain proper thermistor temperature under varying conditions of applied high frequency power. Another important function of the pulsing energy is to maintain a constant direct current calibration under conditions of varying ambient temperature and varying resistance conditions as the thermistors are changed.

The uni-directional impulse thus permits the direct current indicating device to be calibrated directly in terms of high frequency power absorption in the thermistor; which calibration remains permanent for all conditions of application.

The novel thermistor bridge described in a general manner above has various other applications as a means for measuring high frequency and radiant energy. The direct reading power system may be utilized to measure the energy over a wide range of frequencies to extremely short waves, as, for example, energy in the visible spectrum and the energy in cathode rays. Further, the thermistor type power indicating meter may be used to measure the energy of incident longer waves and thus provide a simple conveniently operated radio frequency wattmeter.

It is therefore an object of our invention to provide a novel direct reading high frequency power meter.

Another object of our invention is to provide a direct reading high-frequency power indicating device readily calibrated in terms of direct current power.

A further object of our invention is to provide a direct reading power indicating device utilizing a constant impedance element as the absorption element.

A still further object of our invention is to provide a high frequency wattmeter utilizing a self-balancing bridge.

Another object of our invention is to provide a control circuit for automatically balancing an impedance bridge.

These and other objects of our invention will now become apparent from the following detailed specification taken in connection with the accompanying drawings in which:

Figure 2 is a schematic wiring diagram of the elements of the thermistor bridge illustrated in Figure 1.

Figure 1:
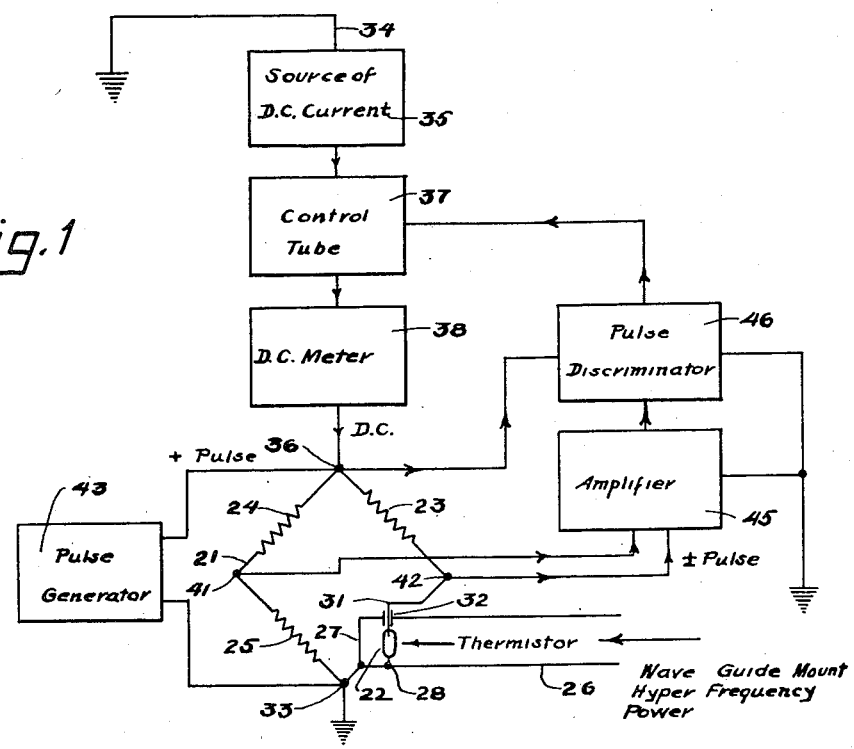
Figure 1 is a block diagram illustrating the general operation of our thermistor bridge.

Referring now to the block diagram of Figure 1, there is shown a simple bridge network 21 comprising essentially a thermistor 22 and three non-inductive resistors 23, 24 and 25.

The thermistor 22, as previously described, is an extremely sensitive resistance element, the resistance of which increases substantially with the decrease in operating temperature. The temperature of the thermistor 22 is determined in the circuit indicated by the power absorbed. In order to secure bridge balance, if resistors 23 and 24 are chosen of equal resistance, then the resistance of resistor 25 must equal the resistance of the thermistor at its operating temperature.

As schematically indicated in Figure 1, the thermistor 22 is supported within a wave guide mount 26 which comprises essentially a section of wave guide which may be readily attached to a wave guide transmission system, the power of which is to be measured.

The wave guide mount 26 is sealed at 27 and the thermistor is supported at a point such that when connected to the source of ultra-high frequency energy, a maximum power transfer will be effected. The thermistor 22 is secured at one end 28 thereof to the walls of the wave guide 26. The other end 31 of the thermistor is insulated and extends through a perforation 32 in the wave guide mount 26 which presents high capacity to the thermistor lead 31 so as to permit all energy in the wave guide to be absorbed by the thermistor.

One junction 33 of the Wheatstone bridge 21 is grounded as is the negative terminals 34 of a source of direct current 35. The positive end of the direct current source 35 is connected to the junction 36 of the four resistance element bridge 21 through a control tube 37 and a direct current meter 38. The control tube 37, as will be described in greater detail later, determines the magnitude of the direct current flowing into the upper junction 36 of the resistance bridge network 21.

As is readily understood, the direct current flowing from positive junction 36 to grounded junction 33 divides through the bridge arm, and when the product of the resistances of resistors 22 and 24 is precisely equal to the product of the resistances of resistors 23 and 25, the voltage appearing between terminals 41 and 42 is zero. For conditions of varying thermistor resistance, bridge unbalance will occur and a positive or negative unbalanced D. C. voltage will appear across terminals 41 and 42. This voltage, however, is not applied to the control circuits of the system illustrated.

Also applied between positive terminal 36 and grounded terminal 33 of the four arm bridge is a uni-directional pulse generated in impulse generator 43. The pulse generator 43 comprises essentially a blocking oscillator of variable frequency. The wave shape of the impulse voltage supplied between terminals 36 and 33 comprises essentially a sharp positive pulse of a duration which is substantially independent of the impulse frequency. As the pulse duration is constant, it is readily seen that the total energy applied to the resistance bridge by the pulse generator is directly a function of the impulse oscillator frequency. The impulse energy supplied to the bridge network divides among the four bridge arms, and under conditions of bridge balance, the impulse voltage appearing between terminals 41 and 42 is zero. For conditions of bridge unbalance, dependent upon whether the thermistor resistance 22 is higher or lower than the three associated bridge arms, a positive or negative impulse will appear between terminals 41 and 42 and be applied to amplifier 45.

The impulse voltage applied to amplifier 45 is used to actuate control tube 37 regulating the D. C. current supplied to the bridge circuit. The amplifier 45 operates in conjunction with a discriminating circuit 46 which serves to distinguish between positive and negative impulses applied to amplifier 45 for determining the direction of the controls affected upon tube 37.

When properly phased, the circuit illustrated in Figure 1 may be arranged so that a tendency towards bridge unbalance due to thermal changes in the thermistor 22 will automatically be counteracted by the direct current energy supplied to the thermistor.

Thus, as illustrated in Figure 1, three sources of energy are utilized to control the resistance of the thermistor elements 22. These three energy sources are the direct current source 35, the impulse source 43, and the energy entering the wave guide 26. For conditions of no ultra-high frequency applied to the thermistor through the wave guide mounting 26, the direct current source is adjusted to provide the greater amount of power required to maintain the thermistor element 22 at the resistance required to balance the bridge. The remainder of the energy required to maintain exact resistance balance is provided by the pulse generator 43.

The bridge is brought into balance by adjustment of the frequency of pulse generator 43, and this adjustment determines the pulse energy applied to thermistor 22. In adjusting the bridge circuit, the direct current is applied and the meter 38, which thus reads the maximum direct current, is arranged to read zero radio frequency power on its scale.

The amount of impulse energy supplied by generator 43 will, of course, be a function of the existing ambient temperature and the particular thermistor 22 utilized in the circuit. As the ambient temperature varies, and the thermistor 22 is changed, the pulse generator may readily be varied to maintain the zero reading of the direct current meter 38.

If at a time that the bridge circuit is at balance and the direct current meter 38 reads zero, an ultra-high frequency wave is impressed upon thermistor 22, then the additional energy absorbed thereby will tend to decrease its circuit resistance, and result in the production of an impulse voltage across terminals 41 and 42.

The polarity of this impulse voltage is such that the amplifier 45 and the polarity discriminating circuit 46 will operate control tube 37 in a manner which reduces the direct current energy supplied to the thermistor 22 as a function of the additional radio frequency energy absorbed thereby. This current reduction is such that bridge balance is approached as indicated by the substantial disappearance of impulse voltage across terminals 41 and 42.

Since therefore the heat applied to thermistor 22 by the incident high frequency energy equals the energy removed by the reduction of current flow from the direct current source 35, the direct current meter 38 may directly indicate the incident high-frequency energy. This meter may be calibrated to read directly in terms of watts or milliwatts of power.

Although in the illustrated embodiment of our invention we have shown the pulsing circuit, it will now be obvious that if desired we can dispense with this added circuit as long as we measure and automatically correct unbalancing occurring in the Wheatstone bridge with power absorption by the thermistor. However, we have found the use of the pulse advantageous. The pulse used is advantageous because the ratio of peak to average power is high.

Referring now to Figure 2, the self-balancing ultra-high frequency power indicating bridge is illustrated in greater detail. As in Figure 1, the thermistor element 22 and the zero temperature coefficient non-inductive resistors 23, 24 and 25 are arranged in the form of a conventional four arm Wheatstone bridge, the junction point 33 being grounded.

A source of direct current 35 which may comprise a battery or rectifier power source is connected to the plate and screen grid of the control tube 37. The cathode of the control tube 37 is connected through direct current meter 38 and through resistor 61 to the positive terminal 36 of the bridge network. The current flow through control tube 37 is determined by the voltage applied to its control grid which in turn is determined by the pulse amplifier and polarity discriminator tube 62 in a manner to be described.

A pulse generator 64 comprises a double triode tube 43 arranged so that one section acts as a blocking oscillator and the other as a suitable stabilizing damping diode. Thus, in the oscillator section, the plate is connected through transformer coil 63 to direct current source 35.

The cathode of the oscillator section of tube 43 is connected to one end of another coil 65 on the same transformer core as 63. The other end of the coil 65 is connected through a suitable blocking condenser 66 to the grid of the blocking oscillator triode section. The grid is also connected to the cathode through a variable resistor 67.

As illustrated, the second triode section of the tube 43 is arranged with grid and plates connected to form a damping diode. The cathode of the damping diode is connected as illustrated to the upper end of coil 65 while the plate of the damping diode section is connected to the lower end thereof.

An output transformer coil 71 is coupled to the bridge circuit and feeds through a blocking condenser 72 to the positive terminal 36 of the bridge network. The blocking oscillator 43 as illustrated is an extremely stable unit generating a constant voltage sharp impulse of substantially constant duration. The impulse duration is unaffected by frequency variation as determined by resistor 67.

Under conditions of bridge unbalance, an unbalanced voltage appears between terminals 41 and 42 of the bridge network. Shunted across the terminals is the primary winding of a transformer 75. This transformer serves to apply to the first grid 76 of double triode 62 the impulse voltage while eliminating the D. C. unbalanced voltage which also appears across terminals 41 and 42.

The first input stage of double triode tube 62 comprises essentially an impulse amplifier. The plate of this tube section is connected to a source of positive potential 77 through a plate load resistor 78. The cathode of this tube section is grounded at 79. The first amplifier section of double triode tube 62 need not be designed to maintain critically the wave form of the impulse, since for the control of the circuit as required, wave form distortion is of little consequence.

The output voltage appearing at the plate of the first amplifier section is applied through coupling condenser 81 to the grid 82 of the second triode section of tube 62 used as a polarity discriminator. The grid 82 is connected to the cathode through a grid leak 83 and the cathode in turn is grounded through a blocking condenser 84 in addition to being directly connected to the cathode of the D. C. control tube 37 through leads 85.

The second section of triode 62, or discriminator, controlled by grid 82, is utilized as the control for the D. C. control tube 37. The direction of control voltage applied to the grid of tube 37 is for proper operation dependent upon the polarity of the impulse appearing between terminals 41 and 42 due to bridge unbalance.

Polarity discrimination is effected, as illustrated in Figure 2, by utilizing the positive impulse generated in tube 43. This impulse is coupled from junction 36 through a condenser 86 to the plate 91 of the discriminator section of tube 62. Accordingly, when plate 91 draws current, the condenser 86 charged upon the application of an impulse, and discharges in the intervals between pulses through the resistor 87. It is to be noted that condenser 86 also precludes the application of direct current from the control tube 37 to the circuit of tube 62.

Upon the application of each impulse to plate 91 through condenser 86, current may flow from plate 91 to the cathode of the second section of tube 62. This current will determine the voltage to which condenser 86 is charged upon the application of impulses thereto. The plate current is in turn controlled by the voltage applied to grid 82 of this tube section, which, as previously described, is determined by the magnitude and polarity of the impulse appearing across terminals 41 and 42. In this manner, the voltage appearing across condenser 86 is a function of the magnitude and polarity of the unbalanced voltage existing across terminals 41 and 42.

The component of voltage across condenser 86, due to plate current drawn by the discriminator half of tube 62, as is illustrated in Figure 2, is applied through resistor 92 to the control grid of control tube 37. The grid is shunted to the cathode through a small condenser 93, which combined with isolation resistor 92 prevents any pulse appearing between grid and cathode of control tube 37. Thus, the aforesaid component voltage across condenser 86, which as previously described is dependent upon the nature of the voltage appearing between terminals 41 and 42, controls the current flowing from the positive direct current source 35 through the control tube 37 and meter 38 to the bridge network. When the transformer 75 is properly phased, the change of current flow through 37 will be in that direction tending to maintain uniform constant dissipation in thermistor 22 necessary to maintain bridge balance.

Summarizing the operation of the bridge, the direct current from source 35 is arranged to bring the current in thermistor 22 to that point whereat it is extremely close to that resistance required to balance the bridge. At this point the meter 38 is adjusted to read full scale deflection and is calibrated to read zero power input from an external source to thermistor 22.

With no high frequency power supplied, the pulse generator frequency is adjusted by grid leak resistor 67 to that frequency whereat the pulse energy supplied to thermistor 22 is sufficient to bring about bridge balance. Upon the application of high frequency energy to the thermistor 22, through the wave guide mounting or other mounting as illustrated in Figure 1, the resistance of thermistor 22 decreases rapidly and results in bridge unbalance with the attendant appearance of an impulse voltage across terminals 41 and 42. This impulse voltage is amplified in the first section of the double triode 62 and applied to the second section thereof used as the polarity discriminator section.

The polarity discriminator section of the triode 62 controls the voltage across the condenser 86 and in turn the voltage upon the control grid of D. C. control tube 37. Under the condition just mentioned of applied high frequency power to thermistor 22, the control grid voltage of tube 37 will become more negative and result in a decrease of direct current supplied to the bridge network at junction 36 through meter 38. Accordingly, the decrease in reading of direct current meter 38 is a direct measure of the power impressed from an external source upon thermistor 22.

If the meter 38 is a direct current milliameter, and if the resistances of 22, 23 and 24 are equal, then the D. C. current in meter 38 is related to the radio frequency power according to the formula $$i = 2\sqrt{\frac{K-HF}{r}}$$

where $i$ is D. C. current in meter 38, $r$ is the resistance in each of the legs, K is maximum D. C. power at which the meter scale reads zero at zero radio frequency power absorption, and HF is the high frequency power absorbed.

The milliameter 38 may thus be calibrated to read directly in terms of D. C. power input to the thermistor 22.

Since the power absorbed by the thermistor 22 is thus a function of a constant minus of the square of the current in the meter 38, the meter variation will not be a linear function of the radio frequency applied power if a conventional type of D. C. milliammeter is utilized. This characteristic however is particularly desirable where our meter is used as a standing wave indicator, since ratios close to unity will be spread out on the sensitive portions of the scale, and permit accurate reading thereof.

However, if the device is utilized to measure power, it is preferable that a direct current meter of the dynamometer type be utilized in order that the deflection be proportional to the square of the current. For this type of direct current milliammeter, the meter deflection will be linearly proportional to the ultra-high frequency energy absorbed by the thermistor.

As is illustrated in Figure 2, resistor 25 is shunted by the series circuit of blocking condenser 101 and comparatively high resistor 102. This shunting circuit for resistor 25 reduces effectively the alternating current impedance of the arm between junction 41 and ground 33 while not effecting the direct current resistance thereof. This reduction in impedance may be necessary if the thermistor element 22 is of an extremely sensitive type, and its resistance varies during the cycle of the applied impulse from generator 43. As a result of this resistance variation during the cycle, the impedance of thermistor 22 is somewhat lower than its direct current resistance, and to establish a complete balance, the impedance of the corresponding arm in the circuit is lowered as illustrated.

As previously described, the combination of direct current power and impulse power are arranged to provide bridge balance when external high frequency energy is applied to the thermistor 22. The direct current is arranged to cause full scale reading of the meter 38. As the ambient temperature changes, the thermistor 22 will have a different resistance characteristic and, accordingly, a different total power requirement for maintenance of balance with the other three corresponding bridge arms. Accordingly, the pulse generator is varied in frequency to compensate by raising or lowering the applied pulse energy to the thermistor 22.

Similarly, with a change in thermistor elements as would be encountered when changing from a thermistor in a mount which matches a particular wave guide to another thermistor in a mount matching a coaxial transmission line or the like, the characteristic differences inherent in the thermistors may be compensated for by a variation of the impulse frequency. Since the D. C. power is a fixed quantity under the condition of no ultra-high frequency energy applied to the circuit, the D. C. meter of suitable type may be calibrated to indicate directly the ultra-high frequency power applied.

The circuit illustrated in Figures 1 and 2 has various applications necessitating only small variations in the circuit illustrated. For example, if the device is utilized to measure the power in a modulated ultra-high frequency signal, it is possible that synchronism may be established between the modulation frequency and the impulse generator frequency. In this instance, it is desirable to change the impulse generator frequency while not disturbing the bridge balance condition. Accordingly, a simple arrangement may be utilized to vary the impulse duration or peak voltage so that the frequency thereof may be altered while the total energy delivered to the thermistor 22 remains essentially constant.

Figure 3:
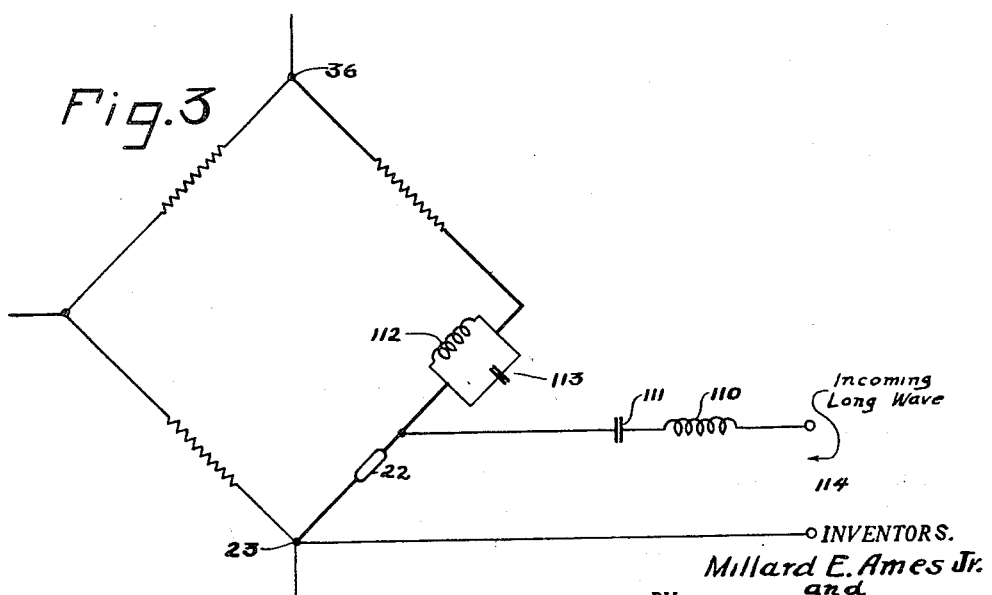
Figure 3 is a schematic diagram illustrating a possible modification of our thermistor bridge.

In order to utilize the thermistor bridge illustrated in Figures 1 and 2 as a radio frequency wattmeter for lower frequencies, the thermistor bridge and the input circuit may be arranged as illustrated in Figure 3. Thus, the bridge network is similar to that illustrated in Figures 1 and 2 except for the arm between terminals 33 and 42 thereof. The input long wave applied to terminals 114 is connected to thermistor 22 through the series resonant circuit comprising inductance 110 and capacitance 111 tuned to the resonant frequency of the waves.

In a series with thermistor 22 is a parallel resonant circuit comprising inductance 112 and capacitance 113, also tuned to the resonant long wave frequency. In this manner, the energy to be measured is applied to the thermistor 22 while resonant circuit 112 and 113 precludes the application thereof to the remainder of the automatic bridge circuit.

Correspondingly, the resonant circuit 110 and 111 precludes the application of D. C. and impulse voltages to the terminals 114 at the input for the signal to be measured. The operation of the bridge upon the application of a signal from the circuit as illustrated in Figure 3 is the same as described in connection with Figures 1 and 2.

The automatic self-balancing bridge illustrated in these drawings may be directly applied to the measurement of temperature without requiring the adjustment necessary in a usual thermocouple type bridge. In this application, the variable temperature element may readily be of extremely small thermal mass while having the required impedance temperature characteristic for the thermistor bridge illustrated.

For the measurement of extremely short wave radiant energy as, for example, light rays or cathode rays or the like, the thermistor element may require special mounting, although the remainder of the indicating circuit remains essentially the same and reads directly the incident power. The short wave energy may be focused upon the thermistor in order to obtain maximum efficiency. The focusing arrangement will, of course, depend upon the particular application to which the instrument is put. For measuring energy disposed in the visible spectrum, the thermistor may be mounted at the center of a highly polished metal sphere which is perforated at one point to permit incident energy to enter and be reflected upon the centrally located thermistor. This system may readily be employed to measure energy in spectrographic analyses and energy received from distant radiant bodies such as the stars. Thus, it is evident that the thermistor bridge or bolometer and the self-balancing circuit hereinabove described may be utilized in many fields by those skilled in the particular art.

Accordingly, we prefer not to be bound by the specific disclosures hereinabove set forth but by the scope of the invention.

We claim:

1. In a system for measuring high frequency power; a transmission line for conducting said power; a thermistor connected in said transmission line for absorbing power therefrom; a measuring device, a source of direct current energy for operating said measuring device, a source of pulsating current and means including circuit connections from said thermistor to said source of direct current power and operated by said source of pulsating current for automatically varying said power delivered by said direct current energy to said measuring device in accordance with the variations in power absorptions of said thermistor.

2. In a system for measuring ultra-high frequency power; a wave guide for conducting wave energy and a thermistor mounted in said wave guide for absorbing power in said wave guide, a Wheatstone bridge circuit having input and output terminals, said thermistor forming one leg of said Wheatstone bridge circuit, a source of direct current connected across the input terminal of said bridge, a second source of pulsating energy connected across the input terminal of said bridge, and means controlled by said second source of energy for varying the power delivered by said direct current source to said bridge in accordance with the variation in power absorbed by said thermistor.

3. In a system for measuring high frequency power; a transmission line; a thermistor connected to absorb energy from said line; a Wheatstone bridge, said thermistor comprising one leg of said bridge, a first source of energy; means including circuit connections for impressing energy from said source across said Wheatstone bridge, a source of pulsating current and means including circuit connections across the output of said Wheatstone bridge and energized by said source of pulsating current for controlling the flow of energy from said first source to said bridge to automatically maintain said bridge in balance as variations in energy absorption by said thermistor tends to throw said bridge out of balance.

4. In a high frequency power indicating device; an impedance element for absorbing high frequency power; a Wheatstone bridge, said impedance element forming one leg of said bridge; a source of direct current applied across one set of opposed terminals of said bridge; means including circuit connections across the other opposed terminals of said bridge for measuring any unbalance in said bridge resulting from power absorbed by said impedance element; a source of pulsating current and means including said source of pulsating curent and controlled by said last mentioned measuring means for controlling the supply of said direct current source to said bridge in accordance with the shift in balance of said bridge.

5. In a high frequency power indicating device; an impedance element for absorbing high frequency power; a Wheatstone bridge, said impedance element forming one leg of said bridge; a source of direct current applied across one set of opposed terminals of said bridge; means including circuit connections across the other opposed terminal of said bridge for measuring the power absorbed by said impedance element, a source of pulsating current for controlling said direct current source to keep the impedance of said impedance element at a constant reference value and a meter operated by said direct current source for indicating said absorbed power.

6. In a high frequency power indicating device; an impedance element for absorbing high frequency energy; a Wheatstone bridge, said impedance element forming one leg of said bridge; a circuit including source of direct current applied across one set of terminals of said bridge; a direct current meter connected in said direct current circuit; a source of pulsating current connected across said set of terminals of said bridge, the energy delivered by said source being adjusted so that with said first direct current source said bridge is balanced and said meter reads zero, and means connected to said bridge and controlled by said source of pulsating current responsive to any unbalance in said bridge for varying the power supply of said direct current source to restore said bridge to balance and to provide on said meter an indication of said variation in power supply.

7. In a system for measuring high frequency power; a thermistor element whose impedance is a function of absorbed power, said element being connected to absorb energy from a high frequency source; a plurality of separate sources of local energy connected to said element one of said sources being direct current and another alternating current, and means including said alternating current source for automatically varying the energy delivered by said direct current source maintaining the total impedance of said element constant.

8. In an electrical measuring system; an element whose impedance is a function of absorbed power, said element being connected to absorb energy from an electrical system, and means for measuring the energy absorbed by said impedance element comprising a source of local energy connected to said element; a second source of energy means including said second source for automatically controlling the supply of energy from said first source to said element for maintaining the total impedance of said element constant as said element absorbs variable amounts of energy; and means for measuring the energy supplied for maintaining the total impedance of said element constant.

MILLARD E. AMES, Jr.
DAVID E. SUNSTEIN.

REFERENCES CITED

The following references are of record in the file of this patent:

UNITED STATES PATENTS

| Number | Name | Date |
| --- | --- | --- |
| 1,039,925 | Gati | Oct. 1, 1912 |
| 1,590,420 | Chubb | June 29, 1926 |
| 1,972,141 | Gilbert | Sept. 4, 1934 |
| 2,169,101 | La Pierre | Aug. 8, 1939 |
| 2,284,379 | Dow | May 26, 1942 |
| 2,399,481 | George | Apr. 30, 1946 |
| 2,399,674 | Harrison | May 7, 1946 |

FOREIGN PATENTS

| Number | Country | Date |
| --- | --- | --- |
| 363,856 | Italy | Oct. 15, 1938 |